(12) United States Patent
Mashrabov et al.

(10) Patent No.: US 12,118,031 B2
(45) Date of Patent: Oct. 15, 2024

(54) PERSONALIZED MEDIA PREVIEW INTERFACE

(71) Applicant: Snap Inc., Santa Monica, CA (US)

(72) Inventors: Aleksandr Mashrabov, Sochi (RU); Victor Shaburov, Pacific Palisades, CA (US); Grigoriy Tkachenko, Sochi (RU); Jeremy Baker Voss, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 256 days.

(21) Appl. No.: 16/990,505

(22) Filed: Aug. 11, 2020

(65) Prior Publication Data

US 2021/0406300 A1    Dec. 30, 2021

Related U.S. Application Data

(60) Provisional application No. 63/046,526, filed on Jun. 30, 2020.

(51) Int. Cl.
| | |
|---|---|
| *G06F 16/535* | (2019.01) |
| *G06F 16/538* | (2019.01) |
| *G06F 16/54* | (2019.01) |
| *G06F 16/58* | (2019.01) |
| *G06V 40/16* | (2022.01) |

(52) U.S. Cl.
CPC .......... *G06F 16/535* (2019.01); *G06F 16/538* (2019.01); *G06F 16/54* (2019.01); *G06F 16/5866* (2019.01); *G06V 40/165* (2022.01)

(58) Field of Classification Search
CPC ...... G06F 16/535; G06F 16/538; G06F 16/54; G06F 16/5866; G06F 16/00; G06F 40/10; G06V 40/165
See application file for complete search history.

(56) References Cited

U.S. PATENT DOCUMENTS

| | | | | |
|---|---|---|---|---|
| 10,706,112 | B1* | 7/2020 | Macadaan | G06Q 30/0255 |
| 2006/0184578 | A1* | 8/2006 | La Rotonda | H04L 51/52 |
| 2010/0332958 | A1* | 12/2010 | Weinberger | G06F 16/4387 |
| | | | | 715/201 |
| 2013/0073970 | A1* | 3/2013 | Piantino | G06F 16/447 |
| | | | | 715/738 |
| 2016/0048601 | A1* | 2/2016 | Narayanan | G06F 16/2455 |
| | | | | 707/722 |
| 2020/0219295 | A1* | 7/2020 | el Kaliouby | G06K 9/6273 |
| 2020/0301571 | A1* | 9/2020 | Sandu | G06F 3/04845 |

* cited by examiner

*Primary Examiner* — Sanchita Roy
(74) *Attorney, Agent, or Firm* — Schwegman Lundberg & Woessner, P.A.

(57) ABSTRACT

A personalized preview system to receive a request to access a collection of media items from a user of a user device. Responsive to receiving the request to access the collection of media items, the personalized preview system accesses user profile data associated with the user, wherein the user profile data includes an image. For example, the image may comprise a depiction of a face, wherein the face comprises a set of facial landmarks. Based on the image, the personalized preview system generates one or more media previews based on corresponding media templates and the image, and displays the one or more media previews within a presentation of the collection of media items at a client device of the user.

14 Claims, 13 Drawing Sheets

PERSONALIZED MEDIA PREVIEW INTERFACE

CLAIM OF PRIORITY

This application claims the benefit of priority to U.S. Provisional Application Ser. No. 63/046,526, filed on Jun. 30, 2020, which is incorporated herein by reference in its entirety.

BACKGROUND

The incorporation of images of real people into digitized animation sequences or images is increasingly popular. Such systems may provide various graphical user interfaces in which a user may capture or otherwise select an image and orient at least a portion of the image within a media item in order to generate a personalized media item.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
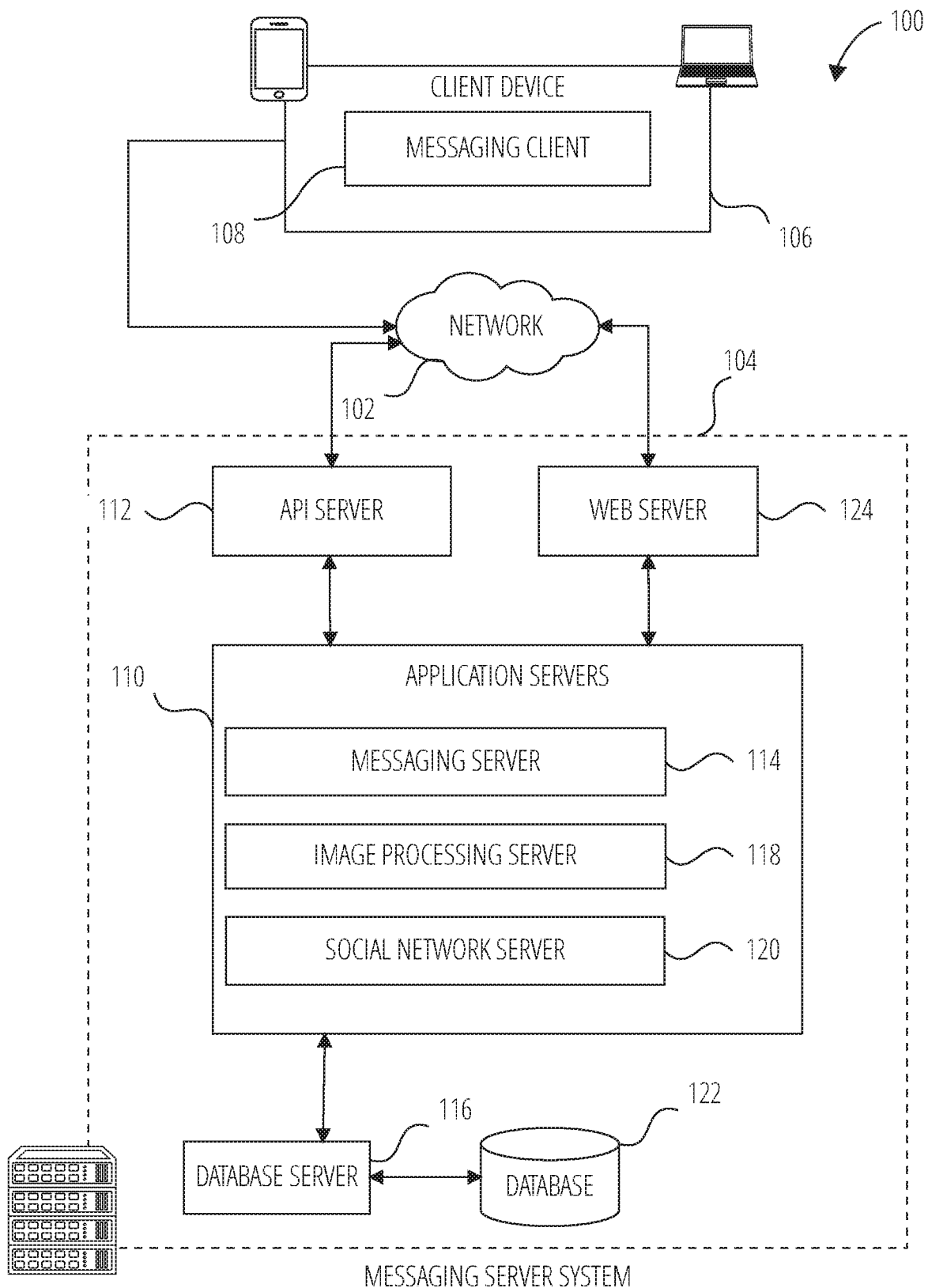
FIG. 1 is a diagrammatic representation of a networked environment in which the present disclosure may be deployed, in accordance with some examples.

The disclosed system provides users with a means for viewing previews of personalized media items within a graphical user interface (GUI). A personalized preview system may receive a request to access a collection of media items from a user of a user device. Responsive to receiving the request to access the collection of media items, the personalized preview system accesses user profile data associated with the user, wherein the user profile data includes an image. For example, the image may comprise a depiction of a face (i.e., of the user), wherein the face comprises a set of facial landmarks. Based on the image, the personalized preview system generates one or more media previews based on corresponding media templates and the image, and displays the one or more media previews within a presentation of the collection of media items at a client device of the user.

In some example embodiments, the personalized preview system may filter the collection of media items based on a contextual factor, wherein the contextual factor includes one or more of: user profile data, such as user preferences; location data; temporal data; user behavior data; and message data. For example, responsive to receiving the request to access the collection of media items, the personalized preview system may curate a set of media items from among the collection of media items based on the contextual factors.

In some example embodiments, the collection of media items may include one or more media templates, wherein the media templates can be personalized based on user profile data such as an image associated with a user profile. The media template may comprise a graphical 1) element wherein one or more portions of the graphical element are configured to receive and display an image which may be provided by a user. For example, the media template may comprise a space to display an image depicting a face of a user, wherein the image depicting the face of the user comprises a set of facial landmarks. In certain embodiments, the media template may further comprise a set of instructions to alter the display of the face of the user depicted in the image, based on positions of the set of facial landmarks.

In some example embodiments, the collection of media items may include one or more media templates configured to receive a plurality of images. A user may provide one or more inputs to the personalized preview system, wherein the inputs identify or otherwise select images to be presented within media templates. For example, in certain embodiments, a user associated with a first user profile may provide an input that selects or otherwise identifies a second user profile, wherein the second user profile has corresponding user profile data that includes an image. Responsive to receiving the input from the user of the client device, the personalized preview system may generate and cause display of a set of media items among a collection of media items, wherein at least a portion of the set of media items are personalized based on the selections.

In some example embodiments, the personalized preview system may cause display of a presentation of the collection of media items that include the personalized media items within a specially configured GUI at a client device. A user may provide an input to sort the collection of media items, such that all personalized media items may be displayed in one section, while the other media items may be displayed in a separate position.

In some example embodiments, a user of the personalized preview system may provide an input to update corresponding user profile data. Responsive to receiving the input that includes the update to the user profile data (i.e., a new image), the personalized preview system may update the personalized media items based on the update to the user profile data.

Consider an illustrative example from a user perspective. A user (i.e., a first user) of the personalized preview system may engage in a communication session with a second user, wherein the first user and second user have corresponding user profile data that include images. The first user may provide an input to access a media repository, wherein the media repository comprises a plurality of media items that include media templates. Responsive to receiving the request to access the media repository, the personalized preview system accesses user profile data associated with the user, wherein the user profile data includes an image that depicts a face (i.e., a face of the user), wherein the depiction of the face comprises a set of facial landmarks. The personalized preview system generates one or more previews of personalized media items based on the media templates and the user profile data, and causes display of a presentation of the previews within a GUI.

The user may then provide an input to present media items personalized based on user profile data from a plurality of user profiles (e.g., two-person media templates). The input may for example include an identification of one or more user profiles. Responsive to receiving the input, the personalized preview system generates a plurality of previews based on media templates configured to display a plurality of images.

Networked Computing Environment

FIG. 1 is a block diagram showing an example messaging system 100 for exchanging data (e.g., messages and associated content) over a network. The messaging system 100 includes multiple instances of a client device 106, each of which hosts a number of applications, including a messaging client 108. Each messaging client 108 is communicatively coupled to other instances of the messaging client 108 and a messaging server system 104 via a network 102 (e.g., the Internet).

A messaging client 108 is able to communicate and exchange data with another messaging client 108 and with the messaging server system 104 via the network 102. The data exchanged between messaging client 108, and between a messaging client 108 and the messaging server system 104, includes functions (e.g., commands to invoke functions) as well as payload data (e.g., text, audio, video or other multimedia data).

The messaging server system 104 provides server-side functionality via the network 102 to a particular messaging client 108. While certain functions of the messaging system 100 are described herein as being performed by either a messaging client 108 or by the messaging server system 104, the location of certain functionality either within the messaging client 108 or the messaging server system 104 may be a design choice. For example, it may be technically preferable to initially deploy certain technology and functionality within the messaging server system 104 but to later migrate this technology and functionality to the messaging client 108 where a client device 106 has sufficient processing capacity.

The messaging server system 104 supports various services and operations that are provided to the messaging client 108. Such operations include transmitting data to, receiving data from, and processing data generated by the messaging client 108. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 108.

Turning now specifically to the messaging server system 104, an Application Program Interface (API) server 112 is coupled to, and provides a programmatic interface to, application servers 110. The application servers 110 are communicatively coupled to a database server 116, which facilitates access to a database 122 that stores data associated with messages processed by the application servers 110. Similarly, a web server 124 is coupled to the application servers 110, and provides web-based interfaces to the application servers 110. To this end, the web server 124 processes incoming network requests over the Hypertext Transfer Protocol (HTTP) and several other related protocols.

The Application Program Interface (API) server 112 receives and transmits message data (e.g., commands and message payloads) between the client device 106 and the application servers 110. Specifically, the Application Program Interface (API) server 112 provides a set of interfaces (e.g., routines and protocols) that can be called or queried by the messaging client 108 in order to invoke functionality of the application servers 110. The Application Program Interface (API) server 112 exposes various functions supported by the application servers 110, including account registration, login functionality, the sending of messages, via the application servers 110, from a particular messaging client 108 to another messaging client 108, the sending of media files (e.g., images or video) from a messaging client 108 to a messaging server 114, and for possible access by another messaging client 108, the settings of a collection of media data (e.g., story), the retrieval of a list of friends of a user of a client device 106, the retrieval of such collections, the retrieval of messages and content, the addition and deletion of entities (e.g., friends) to an entity graph (e.g., a social graph), the location of friends within a social graph, and opening an application event (e.g., relating to the messaging client 108).

The application servers 110 host a number of server applications and subsystems, including for example a messaging server 114, an image processing server 118, and a social network server 120. The messaging server 114 implements a number of message processing technologies and functions, particularly related to the aggregation and other processing of content (e.g., textual and multimedia content) included in messages received from multiple instances of the messaging client 108. As will be described in further detail, the text and media content from multiple sources may be aggregated into collections of content (e.g., called stories or galleries). These collections are then made available to the messaging client 108. Other processor and memory intensive processing of data may also be performed server-side by the messaging server 114, in view of the hardware requirements for such processing.

The application servers 110 also include an image processing server 118 that is dedicated to performing various image processing operations, typically with respect to images or video within the payload of a message sent from or received at the messaging server 114.

The social network server 120 supports various social networking functions and services and makes these functions and services available to the messaging server 114. Examples of functions and services supported by the social network server 120 include the identification of other users of the messaging system 100 with which a particular user has relationships or is "following," and also the identification of other entities and interests of a particular user.

System Architecture

Figure 2:
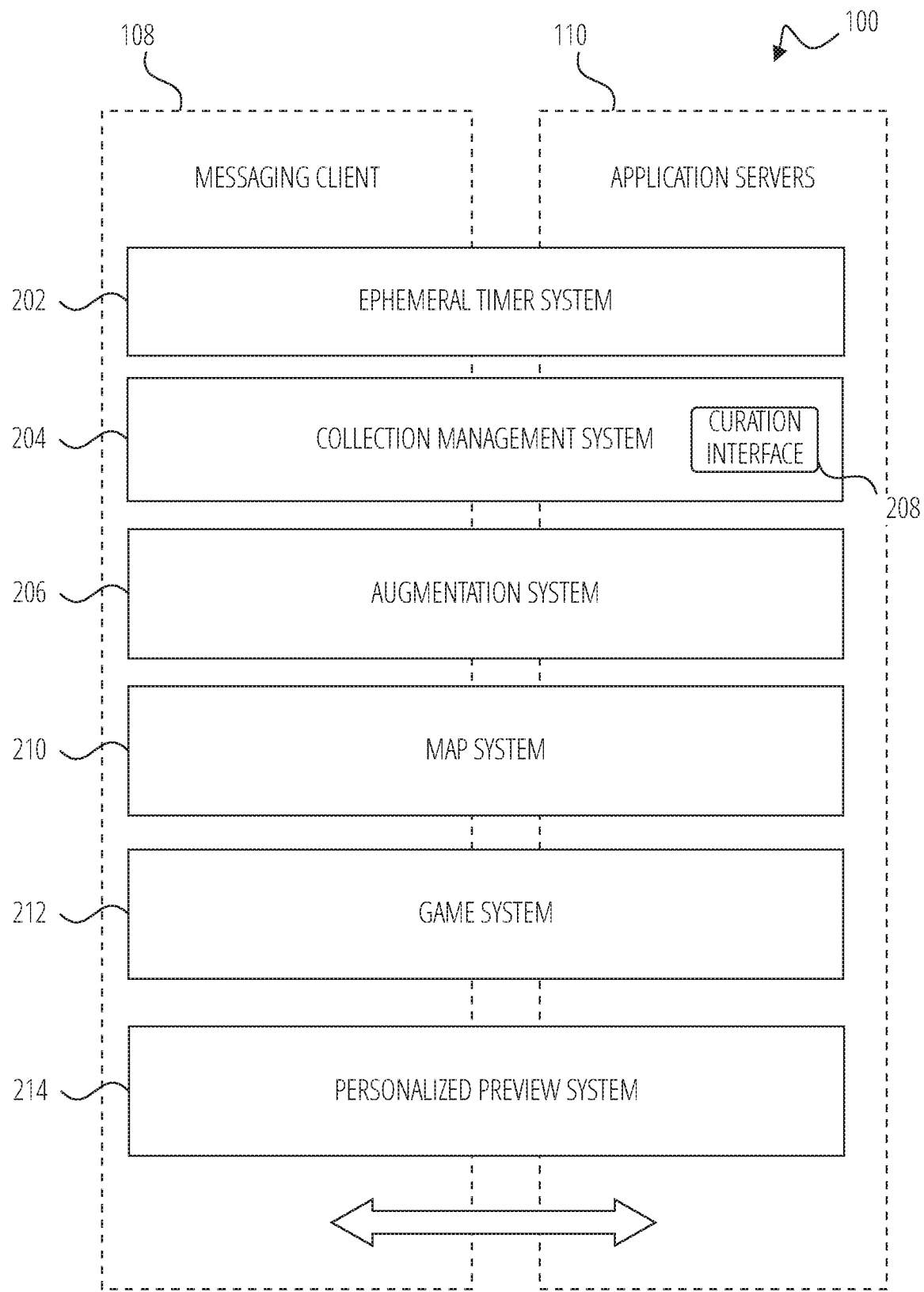
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 108 and the application servers 110. The messaging system 100 embodies a number of subsystems, which are supported on the client-side by the messaging client 108 and on the sever-side by the application servers 110. These subsystems include, for example, an ephemeral timer system 202, a collection management system 204, an augmentation system 206, a map system 210, a game system 212, and a personalized preview system 214.

The ephemeral timer system 202 is responsible for enforcing the temporary or time-limited access to content by the messaging client 108 and the messaging server 114. The ephemeral timer system 202 incorporates a number of timers that, based on duration and display parameters associated with a message, or collection of messages (e.g., a story), selectively enable access (e.g., for presentation and display) to messages and associated content via the messaging client 108. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 108.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content associated with a message. For example, the augmentation system 206 provides functions related to the generation and publishing of media overlays for messages processed by the messaging system 100. The augmentation system 206 operatively supplies a media overlay or augmentation (e.g., an image filter) to the messaging client 108 based on a geolocation of the client device 106. In another example, the augmentation system 206 operatively supplies a media overlay to the messaging client 108 based on other information, such as social network information of the user of the client device 106. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 106. For example, the media overlay may include text or image that can be overlaid on top of a photograph taken by the client device 106. In another example, the media overlay includes an identification of a location overlay (e.g., Venice beach), a name of a live event, or a name of a merchant overlay (e.g., Beach Coffee House). In another example, the augmentation system 206 uses the geolocation of the client device 106 to identify a media overlay that includes the name of a merchant at the geolocation of the client device 106. The media overlay may include other indicia associated with the merchant. The media overlays may be stored in the database 122 and accessed through the database server 116.

In some examples, the augmentation system 206 provides a user-based publication platform that enables users to select a geolocation on a map and upload content associated with the selected geolocation. The user may also specify circumstances under which a particular media overlay should be offered to other users. The augmentation system 206 generates a media overlay that includes the uploaded content and associates the uploaded content with the selected geolocation.

In other examples, the augmentation system 206 provides a merchant-based publication platform that enables merchants to select a particular media overlay associated with a geolocation via a bidding process. For example, the augmentation system 206 associates the media overlay of the highest bidding merchant with a corresponding geolocation for a predefined amount of time.

The map system 210 provides various geographic location functions, and supports the presentation of map-based media content and messages by the messaging client 108. For example, the map system 210 enables the display of user icons or avatars (e.g., stored in profile data 316 (deleted)) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 108. A user can furthermore share his or her location and status information (e.g., using an appropriate status avatar) with other users of the messaging system 100 via the messaging client 108, with this location and status information being similarly displayed within the context of a map interface of the messaging client 108 to selected users.

The game system 212 provides various gaming functions within the context of the messaging client 108. The messaging client 108 provides a game interface providing a list of available games that can be launched by a user within the context of the messaging client 108, and played with other users of the messaging system 100. The messaging system 100 further enables a particular user to invite other users to participate in the play of a specific game, by issuing invitations to such other users from the messaging client 108. The messaging client 108 also supports both the voice and text messaging (e.g., chats) within the context of gameplay, provides a leaderboard for the games, and also supports the provision of in-game rewards (e.g., coins and items).

The personalized preview system 214 provides functions related to generating and causing display of personalized previews of media items based on user profile data and one or more media templates, according to certain example embodiments.

Figure 3:
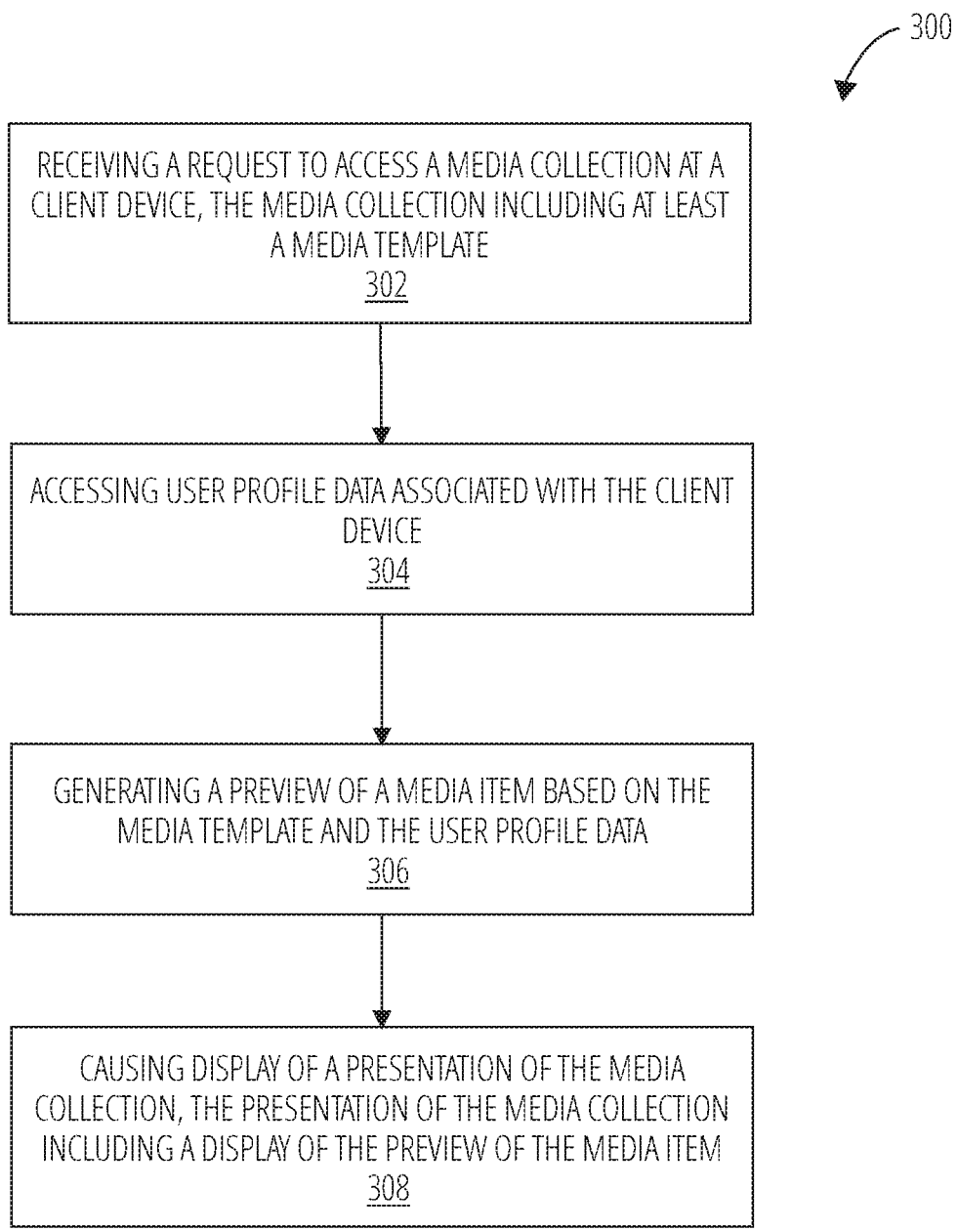
FIG. 3 is a flowchart depicting a method 300 for generating and causing display of a preview of a personalized media item, in accordance with one embodiment.

FIG. 3 is a flowchart illustrating operations of a personalized preview system 214 in performing a method 300 for generating and causing display of a preview of a personalized media item, according to certain example embodiments. Operations of the method 300 may be performed by one or more subsystems of the messaging system 100 described above with respect to FIG. 2, such as the personalized preview system 214. As shown in FIG. 3, the method 300 includes one or more operations, 302, 304, 306, and 308.

At operation 302, the personalized preview system 214 receives a request to access a media collection from a client device 106, wherein the media collection includes at least a media template. For example, in some embodiments, a user may provide inputs to compose a message to be distributed to one or more recipients, wherein a message composition interface presented by the personalized preview system 214 may include a window to receive inputs to select one or more media items to be applied to a message.

Figure 7:
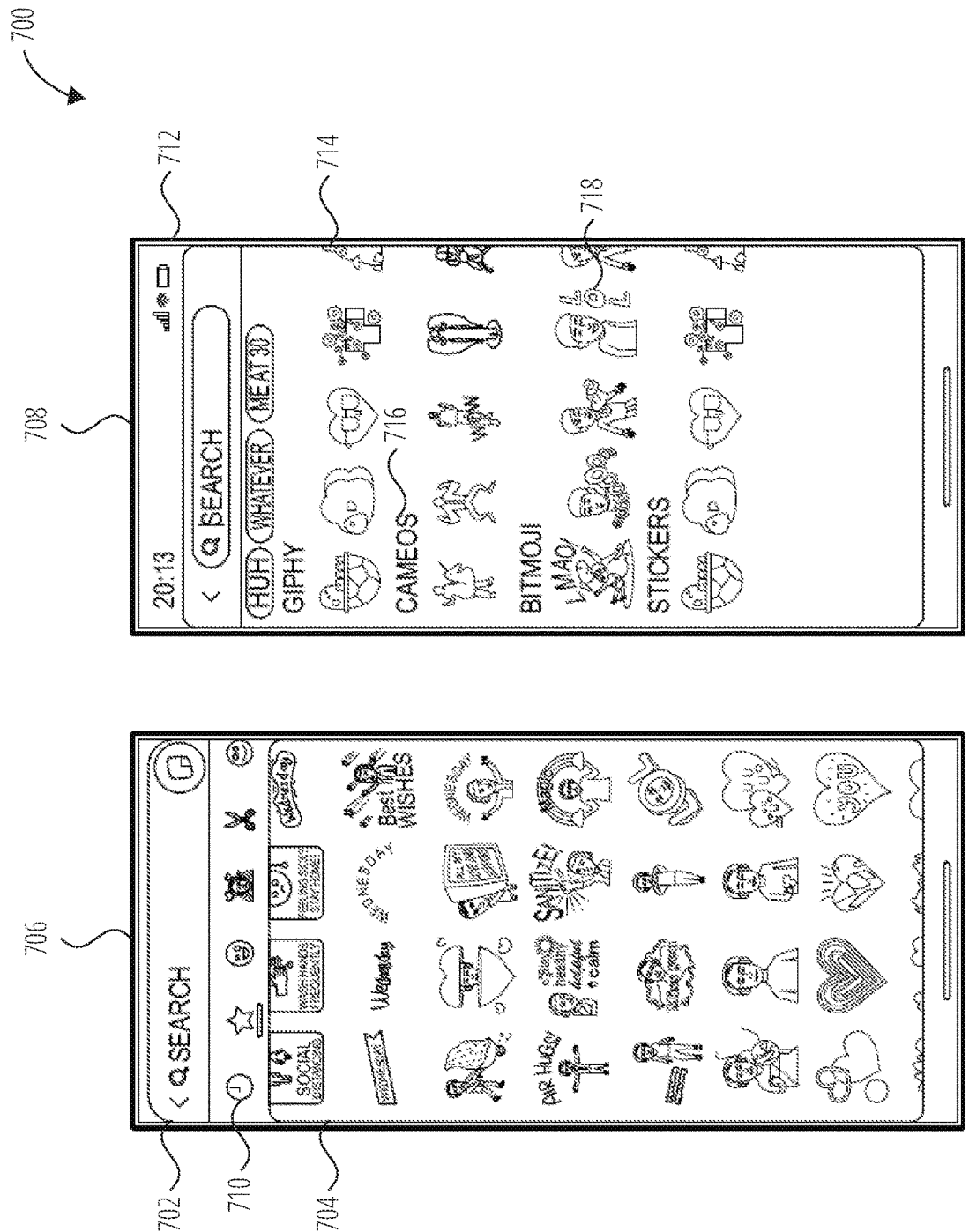
FIG. 7 illustrates an interface flow diagram 700 in accordance with one embodiment.

In some embodiments, the request to access the media collection may include a query term. For example, as depicted in FIG. 7, a user may provide a query term into a search interface 702, wherein the query term comprises a string of characters.

In some embodiments, the request to access the media collection may include an input that selects a media category icon 710 from among a set of media categories presented within a media selection interface 706. For example, in some embodiments, the media categories may include a "personalized" media category that comprises a set of media templates that may be customized based on inputs that may include user profile data.

In some embodiments, the request to access the media collection may include metadata that includes one or more of: temporal data; location data, and message data, wherein the personalized preview system 214 may utilize such metadata to filter media content from among the media collection. For example, media content among the media collection may include corresponding tags that correlate the media content with a particular location which may be identified by the location data.

At operation 304, the personalized preview system 214 accesses user profile data associated with a user of the client device 106. For example, the user profile data may include an image that comprises a set of facial landmarks.

In some embodiments, responsive to receiving the request to access the media collection, the personalized preview system 214 may cause display of a request to receive user profile data. For example, in some embodiments, the request to receive user profile data may include an interface to enable a user to capture image data, wherein the interface provides guidance for the user to align a camera to capture an image of a face.

At operation 306, the personalized preview system 124 generates a preview of a media item based on the media template and the user profile data. For example, the media template may include a space configured to receive and display the image that includes the set of facial landmarks, and in some embodiments may alter positions of the set of facial landmarks based on a machine learned model.

Figure 8:
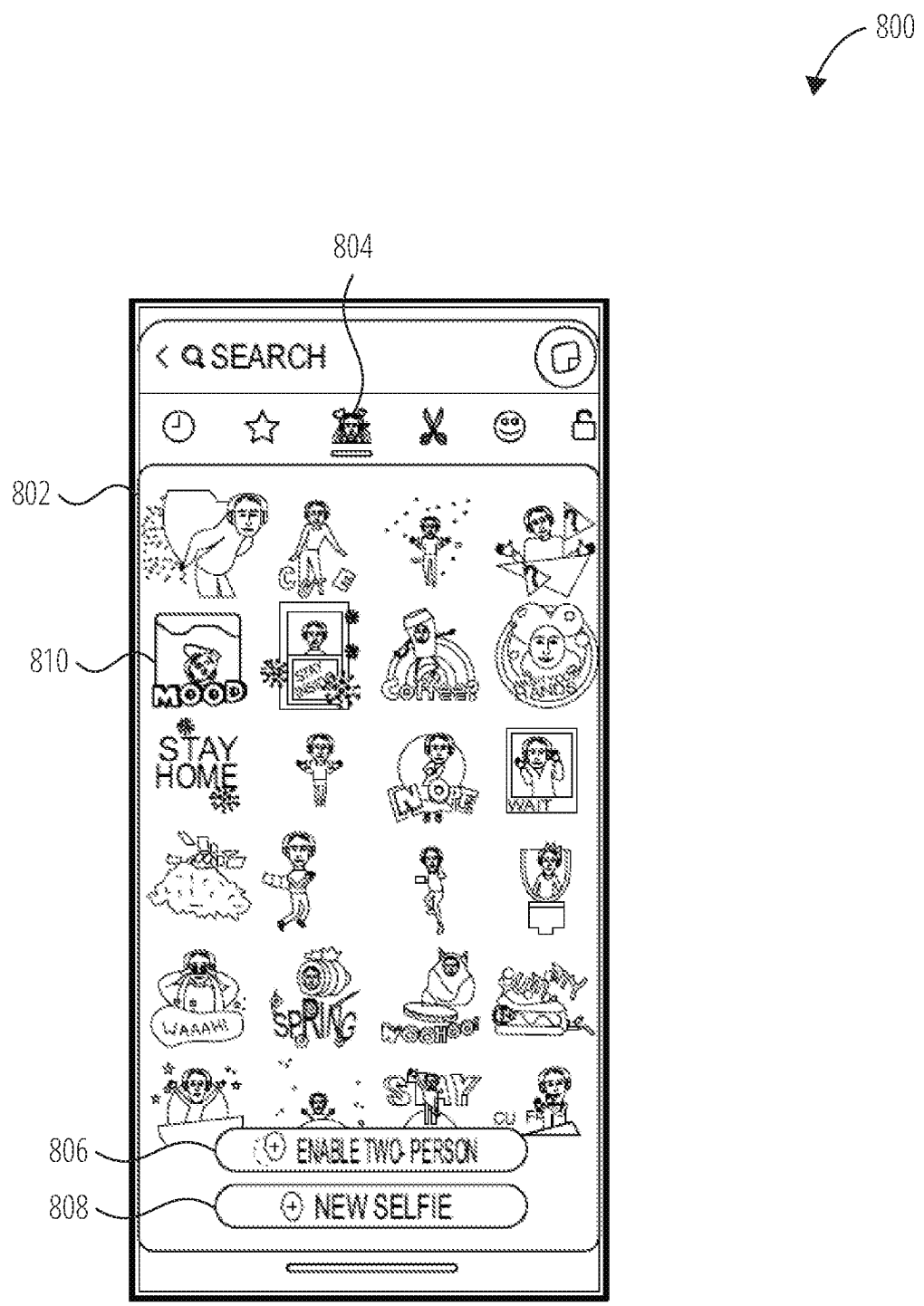
FIG. 8 is an interface diagram 800 in accordance with one embodiment.

At operation 308, the personalized preview system 214 causes display of a presentation of the media collection, wherein the presentation of the media collection includes a display of the preview of the media item. For example, as seen in FIG. 8, the personalized preview system 214 may present the personalized preview interface 802, wherein the personalized preview interface 802 comprises a display of a plurality of personalized media items, such as the personalized media item 810.

Figure 4:
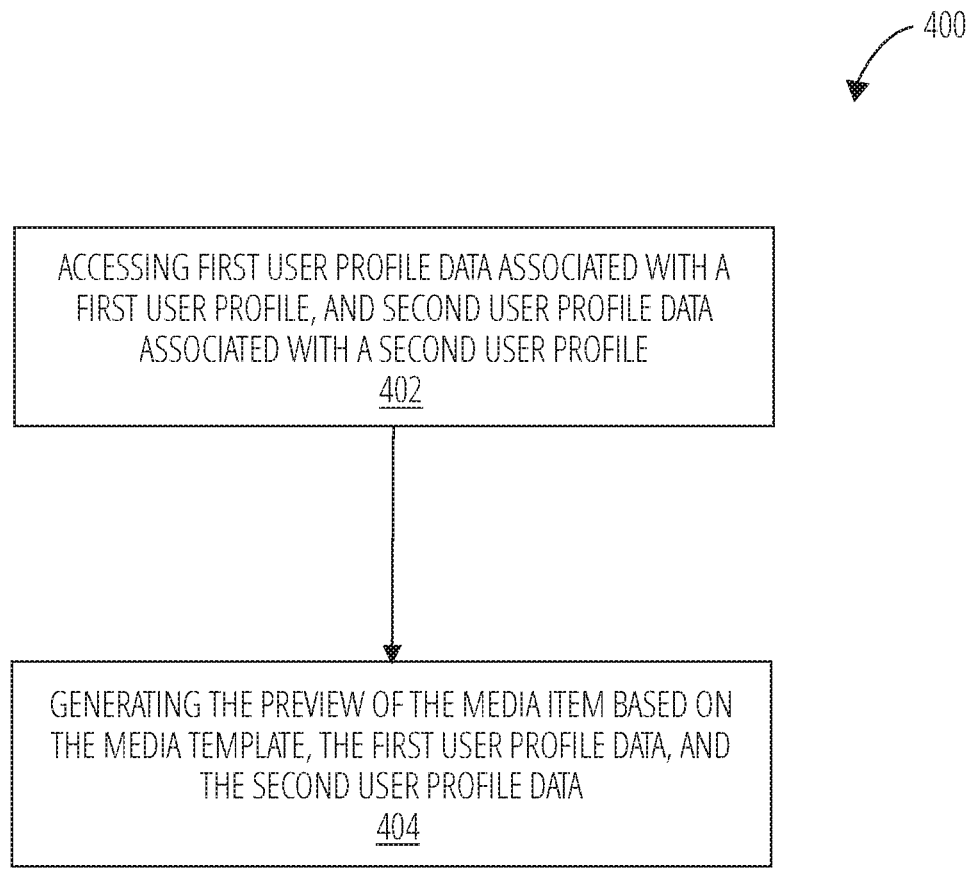
FIG. 4 is a flowchart depicting a method 400 for generating a preview of a personalized media item, in accordance with one embodiment.

FIG. 4 is a flowchart illustrating operations of a personalized preview system 214 in performing a method 400 for generating a preview of a personalized media item, according to certain example embodiments. Operations of the method 400 may be performed by one or more subsystems of the messaging system 100 described above with respect to FIG. 2, such as the personalized preview system 214. As shown in FIG. 4, the method 400 includes one or more operations 402, 404, and 406 which may be performed as a subroutine of the method 300.

At operation 402, the personalized preview system 214 accesses first user profile data associated with a first user profile and second user profile data associated with a second user profile. For example, the user profile data may include image data that comprises a display of a set of facial features.

In some embodiments, the personalized preview system 214 may access the first user profile data and the second user profile data responsive to receiving an input that selects or otherwise identifies that the media content presented in the media collection include media content which may be personalized based on user profile data from a plurality of user profiles. For example, as seen in the interface diagram 800 FIG. 8, a user of the personalized preview system 214 may provide an input to select the personalization option 806, wherein the personalization option 806 causes the personalized preview system 214 to access "two-person: media content from among the collection of media content. For example, the two-person media content may include media content configured to be personalized based on user profile data from a plurality of user profiles. As an illustrative example, the media content may comprise a display of two distinct avatars (e.g., Bitmoji), wherein the avatars may be configured based on user profile data from a plurality of user profiles. For example, the avatars may include a blank field to display an image which may be retrieved from a user profile.

At operation 404, the personalized preview system 214 generates a preview of a media item based on a media template, the first user profile data, and the second user profile data. The user profile data may include image data that depicts a face, or set of facial features, associated with a user, and the media template may include the media template 904 as depicted in the interface diagram 900 of FIG. 9.

In some embodiments, generating the preview of the media item based on the media template, the first user profile data, and the second user profile data may include accessing image data from the first user profile and the second user profile, wherein the image data comprises a depiction of one or more facial features, and applying the image data to one or more positions within the media template, based on properties of the media template. For example, the media template may include one or more fields to display the image data. Accordingly, the preview of the media item generated based on the user profile data may be presented among a collection of media items, as seen in the interface diagram 800 depicted in FIG. 8.

Figure 5:
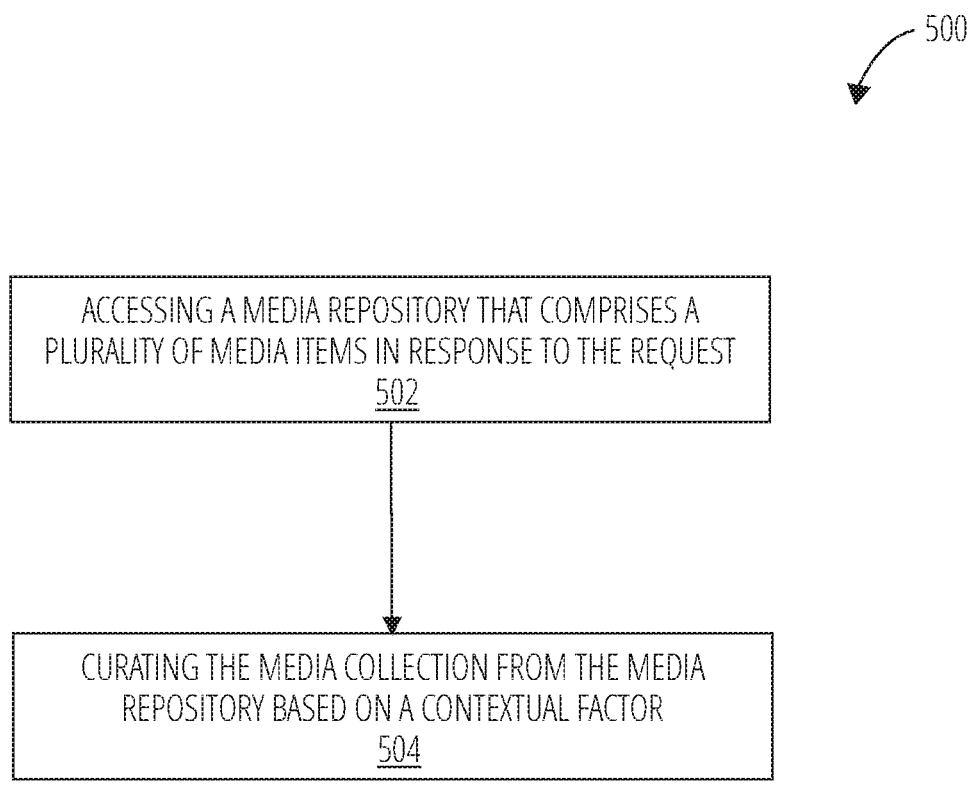
FIG. 5 is a flowchart depicting a method 500 for curating a collection of media items, in accordance with one embodiment.

FIG. 5 is a flowchart illustrating operations of a personalized preview system 214 in performing a method 500 for curating a collection of media items, according to certain example embodiments. Operations of the method 500 may be performed by one or more subsystems of the messaging system 100 described above with respect to FIG. 2, such as the personalized preview system 214. As shown in FIG. 5, the method 500 includes one or more operations 502, 504, 506, and 508, that may be performed as a subroutine of the method 300.

At operation 502, the personalized preview system 214 accesses a media repository that comprises a plurality of media items in response to the request from the client device 106 to access the media collection.

In some embodiments, the request to access the media collection may include corresponding request metadata that includes one or more of: location data; user profile data; temporal data; and message content data.

In some embodiments, the request to access the media collection may include a request to generate or compose a message. For example, the personalized preview system 214 may generate and cause display of a message composition interface, wherein the message composition interface include a window to receive inputs to select media content to be applied or included in a message.

In some embodiments, the request to access the media collection may include an explicit input received from a client device 106 to access a catalogue of media items.

At operation 504, the personalized preview system 214 curates the media collection from the media repository based on a contextual factor, wherein the contextual factor includes one or more of: user profile data, including user behavior data and user preferences; location data, including location data associated with a geo-fence; temporal data; and message data.

Figure 6:
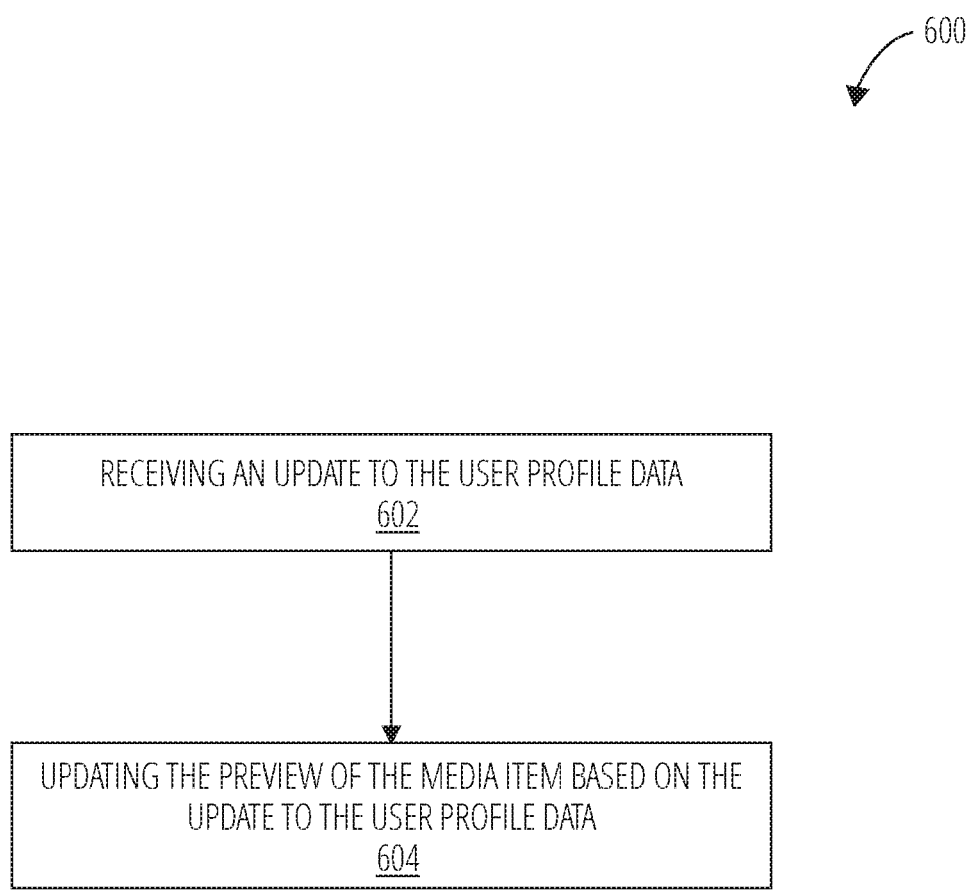
FIG. 6 is a flowchart depicting a method 600 for generating a preview of a personalized media item, in accordance with one embodiment.

FIG. 6 is a flowchart illustrating operations of a personalized preview system 214 in performing a method 600 for generating a preview of a personalized media item, according to certain example embodiments. Operations of the method 600 may be performed by one or more subsystems of the messaging system 100 described above with respect to FIG. 2, such as the personalized preview system 214. As shown in FIG. 6, the method 600 includes one or more operations 602 and 604, which may be performed as a precursor to the method 300.

At operation 602, the personalized preview system 214 receives an update to the user profile data. For example, a user associated with the user profile may provide an input to update an image associated with the user profile.

According to certain embodiments, the input may include an input that selects the new image icon 808 as depicted in the interface diagram 800 of FIG. 8. Responsive to receiving the input that selects the new image icon 808, the personalized preview system 214 may activate? a camera associated with the client device 106 in order to capture image data.

At operation 604, the personalized preview system 214 updates the preview of the media item among the presentation of the media collection based on the update to the user profile data.

FIG. 7 is an interface flow diagram 700 depicting GUIs presented by the personalized preview system 214, according to certain example embodiments. As seen in FIG. 7, the interface flow diagram 700 may include a media selection interface 706 and a filtered media selection interface 708, wherein the filtered media selection interface 708 comprises a display of filtered media collection 714, wherein the filtered media collection 714 is based on a set of filter criteria which may be received from the search interface 702, and the media collection 704.

In some example embodiments, a user may provide an input into the search interface 702 presented in the media selection interface 706, and provide an input that selects the media category icon 710 from among a set of media category icons that correspond with media categories in order to filter the media collection 704. For example, media categories may include categories that correspond with media types (i.e., gifs, videos, images, audio clips, filters, etc.), as well as media categories that correspond with categories of content (i.e., sports, food, location based, etc.).

Based on the inputs received from the user, the personalized preview system 214 may present the filtered media collection 714 within the filtered media selection interface 708. According to certain embodiments, the filtered media collection 714 may comprise a plurality of personalized media items 718, wherein the personalized media item 718 may be categorized and displayed in corresponding media categories, such as the media category 716.

FIG. 8 is an interface diagram 800 depicting a GUI presented by the personalized preview system 214, according to certain example embodiments.

According to certain embodiments, a personalized preview interface 802 comprises a display of a plurality of personalized media items, such as the personalized media item 810, wherein the personalized media items may be personalized based on parameters that include user profile data.

In some embodiments, a user may provide an input that selects a personalized media icon 804. Responsive to the input that selects the personalized media icon 804, the personalized preview system 214 may identify a plurality of media items from among a collection of media content, wherein the plurality of media items may be personalized based on user profile data.

In some embodiments, a user may provide an input to select the personalization option 806 in order to generate and display preview of multi-person (i.e., two-person) media items. For example, the multi-person media items may comprise media items configured to be personalized based on user profile data (i.e., image data) retrieved from a plurality of user profiles.

In some embodiments, a user may provide an input to select the new image icon 808. Responsive to the input that selects the new image icon 808, the personalized preview system 214 may activate a camera associated with the client device 106 in order to capture and update image data associated with a user profile. Responsive to receiving the update to the image data associated with the user profile, the personalized preview system 214 may generate previews of media items to update the personalized preview interface 802.

Figure 9:
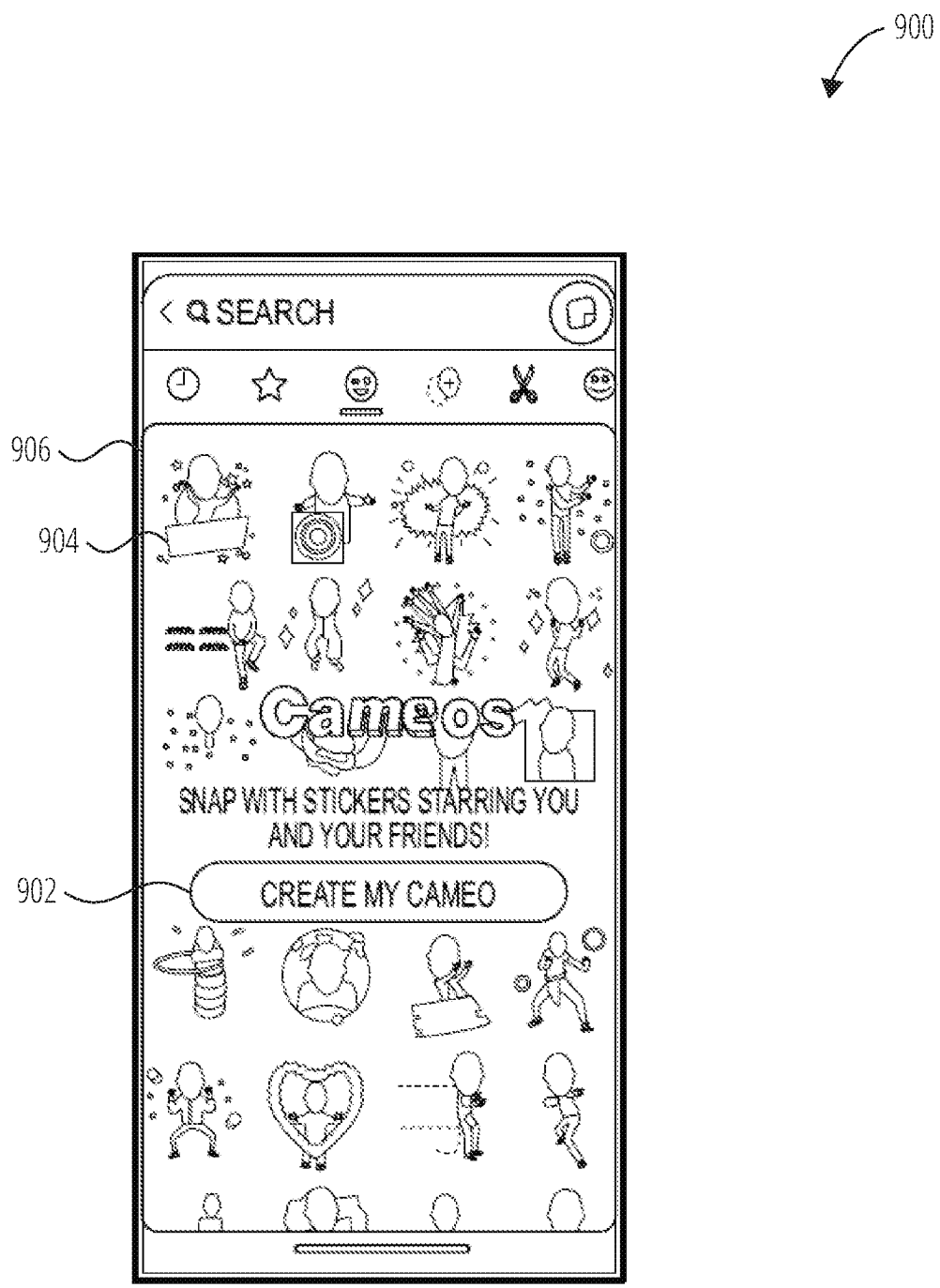
FIG. 9 illustrates an interface diagram 900 in accordance with one embodiment.

FIG. 9 is an interface diagram 900 depicting a GUI presented by the personalized preview system 214, according to certain example embodiments.

According to certain embodiments, the personalized preview system 214 may provide access to a media template collection 906, wherein the media template collection 906 comprises one or more media templates, such as the media template 904.

In some embodiments, a user of the 214 may provide an input to select the personalized preview request 902 in order to generate and cause display of a plurality of previews of personalized media items, as depicted in the personalized preview interface 802 of interface diagram 800.

Figure 10:
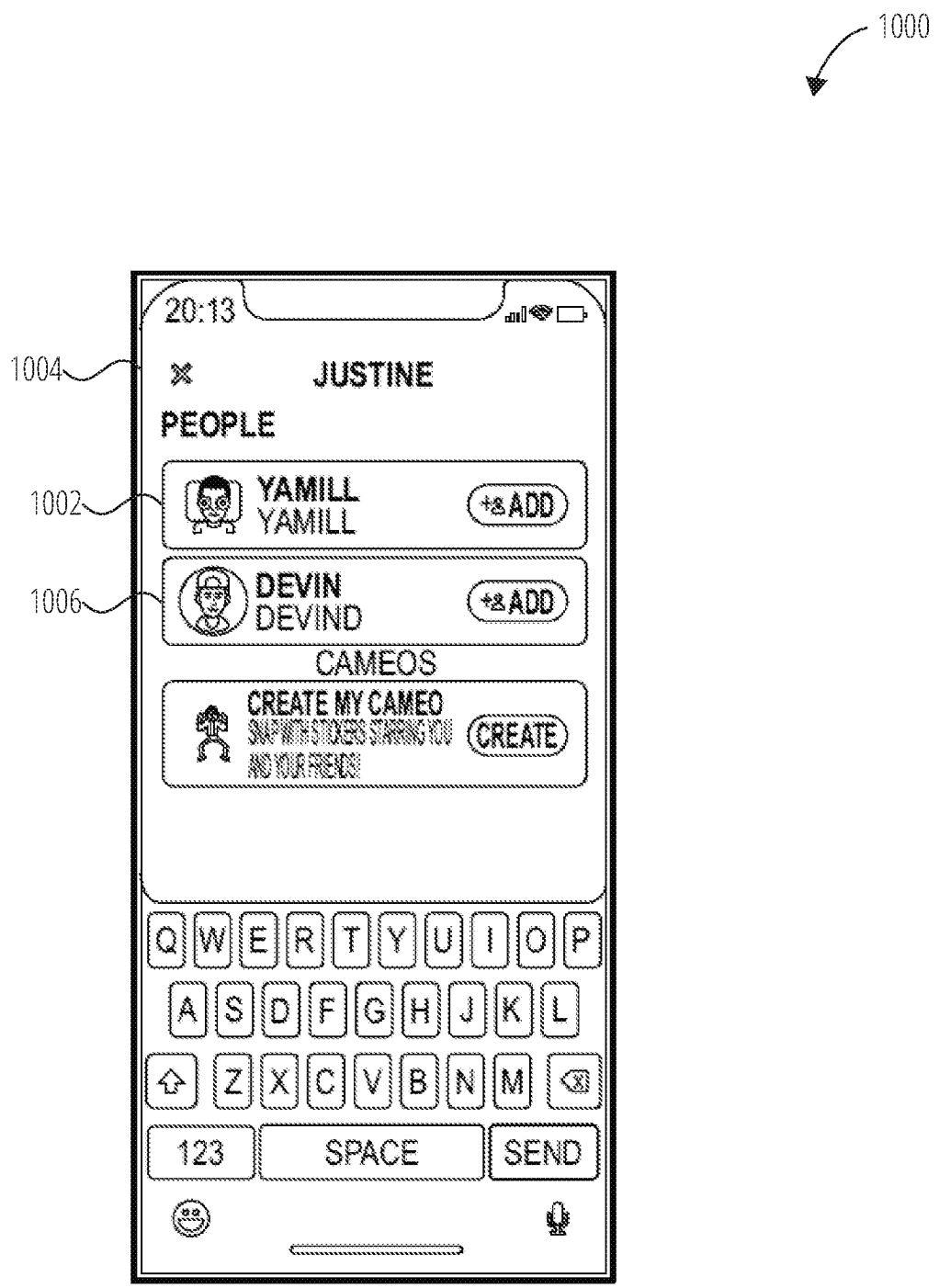
FIG. 10 illustrates an interface diagram 1000 in accordance with one embodiment.

FIG. 10 is an interface diagram 1000 depicting a GUI presented by the personalized preview system 214, according to certain example embodiments.

As seen in the interface diagram 1000, a personalization interface 1004 may provide a display of one or more user identifiers, such as the user identifier 1002 and user identifier 1006 to generate and cause display of a preview of personalized multi-person media content.

Accordingly, a user of the personalized preview system 214 may provide inputs to select one or more user identifiers, such as the user identifier 1002, in order to generate and display a preview of personalized media content based on user profile data that corresponds with at least the user identifier 1002.

Machine Architecture

Figure 11:
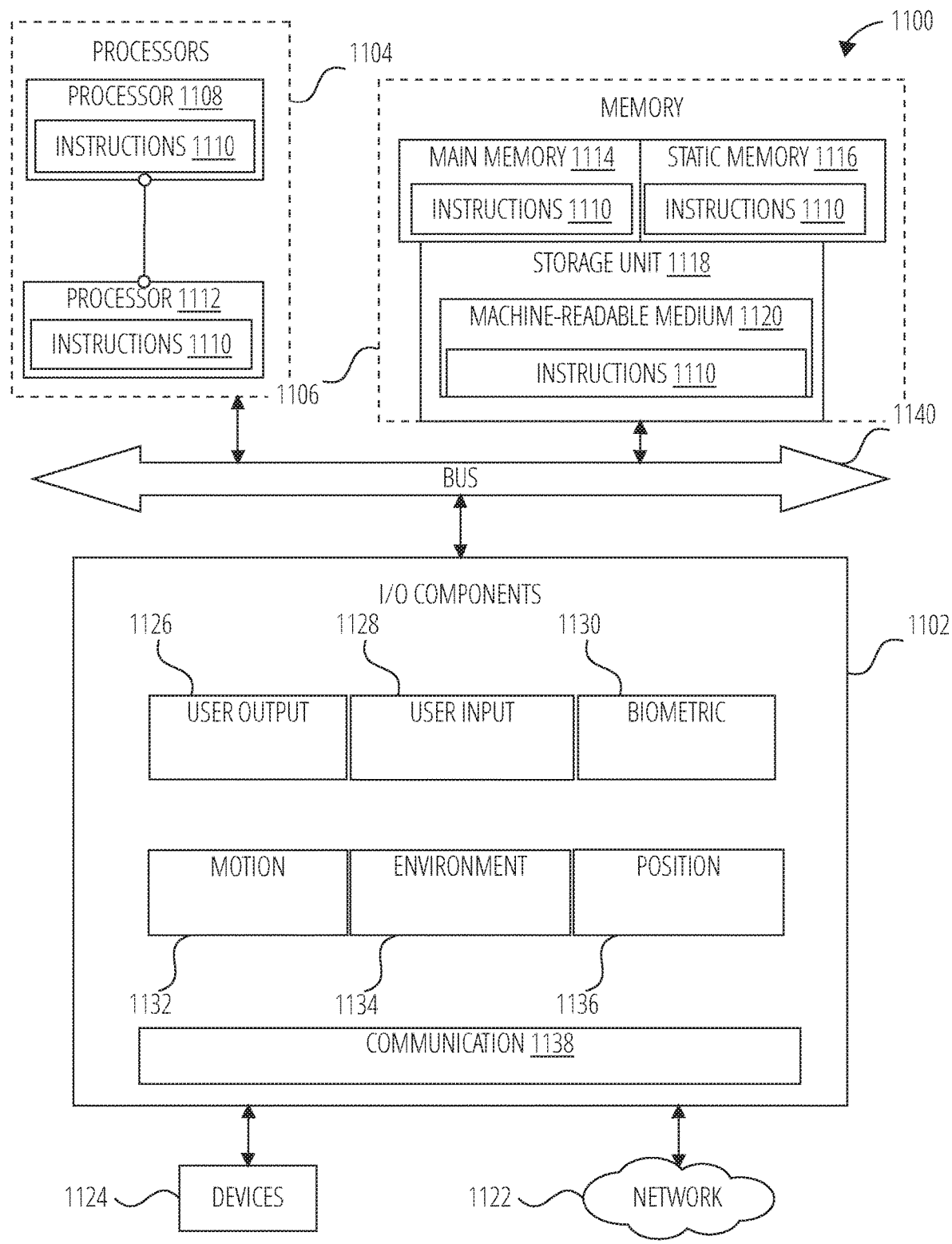
FIG. 11 is a diagrammatic representation of a machine in the form of a computer system within which a set of instructions may be executed for causing the machine to perform any one or more of the methodologies discussed herein, in accordance with some examples.

FIG. 11 is a diagrammatic representation of the machine 1100 within which instructions 1110 (e.g., software, a program, an application, an applet, an app, or other executable code) for causing the machine 1100 to perform any one or more of the methodologies discussed herein may be executed. For example, the instructions 1110 may cause the machine 1100 to execute any one or more of the methods described herein. The instructions 1110 transform the general, non-programmed machine 1100 into a particular machine 1100 programmed to carry out the described and illustrated functions in the manner described. The machine 1100 may operate as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1110, sequentially or otherwise, that specify actions to be taken by the machine 1100. Further, while only a single machine 1100 is illustrated, the term "machine" shall also be taken to include a collection of machines that individually or jointly execute the instructions 1110 to perform any one or more of the methodologies discussed herein. The machine 1100, for example, may comprise the client device 106 or any one of a number of server devices forming part of the messaging server system 104. In some examples, the machine 1100 may also comprise both client and server systems, with certain operations of a particular method or algorithm being performed on the server-side and with certain operations of the particular method or algorithm being performed on the client-side.

The machine 1100 may include processors 1104, memory 1106, and input/output I/O components 638, which may be configured to communicate with each other via a bus 1140. In an example, the processors 1104 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1108 and a processor 1112 that execute the instructions 1110. The term "processor" is intended to include multi-core processors that may comprise two or more independent processors (sometimes referred to as "cores") that may execute instructions contemporaneously. Although FIG. 11 shows multiple processors 1104, the machine 1100 may include a single processor with a single-core, a single processor with multiple cores (e.g., a multi-core processor), multiple processors with a single core, multiple processors with multiples cores, or any combination thereof.

The memory 1106 includes a main memory 1114, a static memory 1116, and a storage unit 1118, both accessible to the processors 1104 via the bus 1140. The main memory 1106, the static memory 1116, and storage unit 1118 store the instructions 1110 embodying any one or more of the methodologies or functions described herein. The instructions 1110 may also reside, completely or partially, within the main memory 1114, within the static memory 1116, within machine-readable medium 1120 within the storage unit 1118, within at least one of the processors 1104 (e.g., within the Processor's cache memory), or any suitable combination thereof, during execution thereof by the machine 1100.

The I/O components 1102 may include a wide variety of components to receive input, provide output, produce output, transmit information, exchange information, capture measurements, and so on. The specific I/O components 1102 that are included in a particular machine will depend on the type of machine. For example, portable machines such as mobile phones may include a touch input device or other such input mechanisms, while a headless server machine will likely not include such a touch input device. It will be appreciated that the I/O components 1102 may include many other components that are not shown in FIG. 11. In various examples, the I/O components 1102 may include user output components 1126 and user input components 1128. The user output components 1126 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1128 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1102 may include biometric components 1130, motion components 1132, environmental components 1134, or position components 1136, among a wide array of other components. For example, the biometric components 1130 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1132 include acceleration sensor components (e.g., accelerometer), gravitation sensor components, rotation sensor components (e.g., gyroscope).

The environmental components 1134 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 106 may have a camera system comprising, for example, front cameras on a front surface of the client device 106 and rear cameras on a rear surface of the client device 106. The front cameras may, for example, be used to capture still images and video of a user of the client device 106 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 106 may also include a 360o camera for capturing 360o photographs and videos.

Further, the camera system of a client device 106 may include dual rear cameras (e.g., a primary camera as well as a depth-sensing camera), or even triple, quad or penta rear camera configurations on the front and rear sides of the client device 106. These multiple cameras systems may include a wide camera, an ultra-wide camera, a telephoto camera, a macro camera and a depth sensor, for example.

The position components 1136 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1102 further include communication components 1138 operable to couple the machine 1100 to a network 1122 or devices 1124 via respective coupling or connections. For example, the communication components 1138 may include a network interface Component or another suitable device to interface with the network 1122. In further examples, the communication components 1138 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1124 may be another machine or any of a wide variety of peripheral devices (e.g., a peripheral device coupled via a USB).

Moreover, the communication components 1138 may detect identifiers or include components operable to detect identifiers. For example, the communication components 1138 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1138, such as location via Internet Protocol (IP) geolocation, location via Wi-Fi® signal triangulation, location via detecting an NFC beacon signal that may indicate a particular location, and so forth.

The various memories (e.g., main memory 1114, static memory 1116, and memory of the processors 1104) and storage unit 1118 may store one or more sets of instructions and data structures (e.g., software) embodying or used by any one or more of the methodologies or functions described herein. These instructions (e.g., the instructions 1110), when executed by processors 1104, cause various operations to implement the disclosed examples.

The instructions 1110 may be transmitted or received over the network 1122, using a transmission medium, via a network interface device (e.g., a network interface component included in the communication components 1138) and using any one of several well-known transfer protocols (e.g., hypertext transfer protocol (HTTP)). Similarly, the instructions 1110 may be transmitted or received using a transmission medium via a coupling (e.g., a peer-to-peer coupling) to the devices 1124.

Software Architecture

Figure 12:
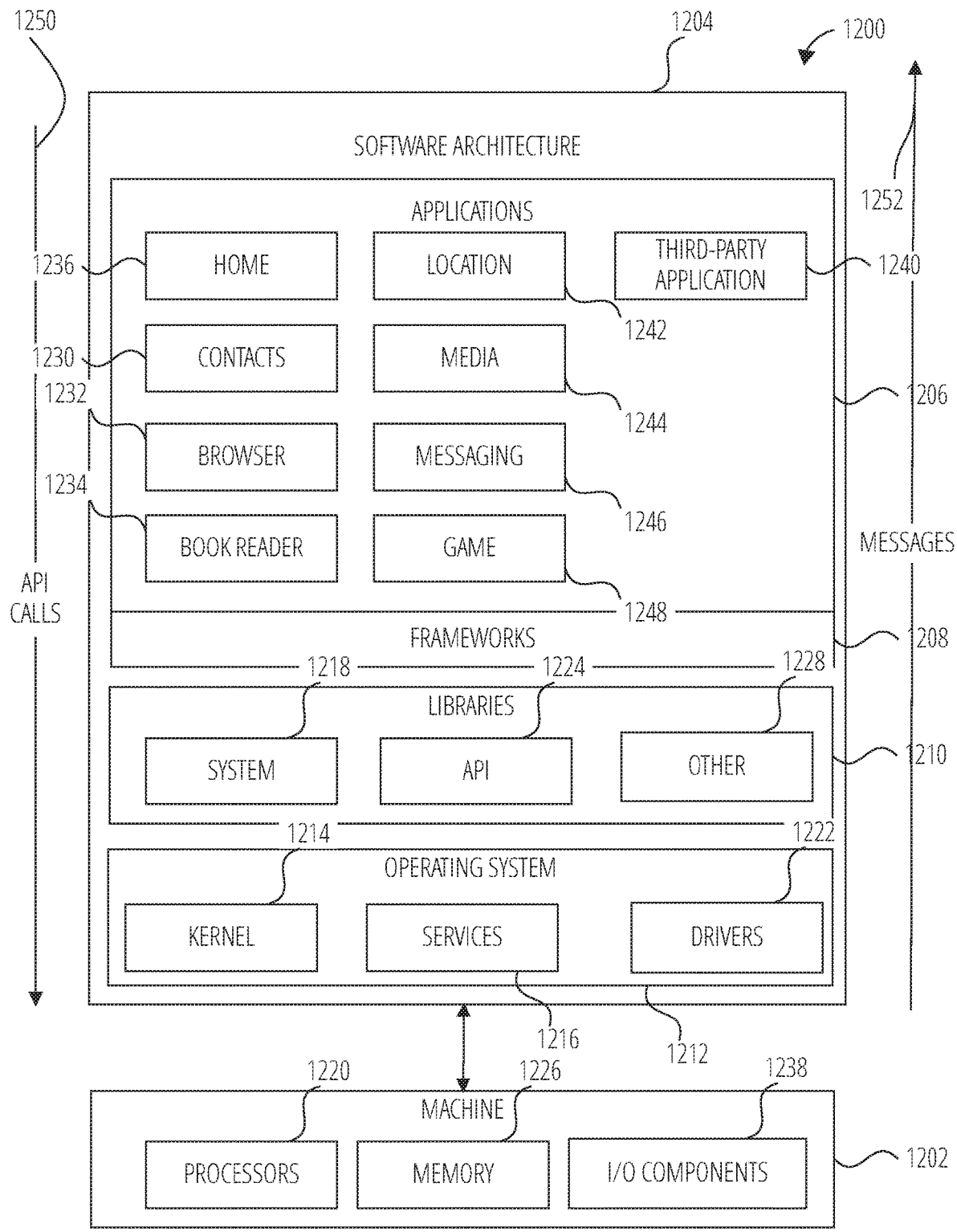
FIG. 12 is a block diagram showing a software architecture within which examples may be implemented.

FIG. 12 is a block diagram 1200 illustrating a software architecture 1204, which can be installed on any one or more of the devices described herein. The software architecture 1204 is supported by hardware such as a machine 1202 that includes processors 1220, memory 1226, and I/O components 1238. In this example, the software architecture 1204 can be conceptualized as a stack of layers, where each layer provides a particular functionality. The software architecture 1204 includes layers such as an operating system 1212, libraries 1210, frameworks 1208, and applications 1206. Operationally, the applications 1206 invoke API calls 1250 through the software stack and receive messages 1252 in response to the API calls 1250.

The operating system 1212 manages hardware resources and provides common services. The operating system 1212 includes, for example, a kernel 1214, services 1216, and drivers 1222. The kernel 1214 acts as an abstraction layer between the hardware and the other software layers. For example, the kernel 1214 provides memory management, processor management (e.g., scheduling), component management, networking, and security settings, among other functionality. The services 1216 can provide other common services for the other software layers. The drivers 1222 are responsible for controlling or interfacing with the underlying hardware. For instance, the drivers 1222 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1210 provide a common low-level infrastructure used by the applications 1206. The libraries 1210 can include system libraries 1218 (e.g., C standard library) that provide functions such as memory allocation functions, string manipulation functions, mathematic functions, and the like. In addition, the libraries 1210 can include API libraries 1224 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1210 can also include a wide variety of other libraries 1228 to provide many other APIs to the applications 1206.

The frameworks 1208 provide a common high-level infrastructure that is used by the applications 1206. For example, the frameworks 1208 provide various graphical user interface (GUI) functions, high-level resource management, and high-level location services. The frameworks 1208 can provide a broad spectrum of other APIs that can be used by the applications 1206, some of which may be specific to a particular operating system or platform.

In an example, the applications 1206 may include a home application 1236, a contacts application 1230, a browser application 1232, a book reader application 1234, a location application 1242, a media application 1244, a messaging application 1246, a game application 1248, and a broad assortment of other applications such as a third-party application 1240. The applications 1206 are programs that execute functions defined in the programs. Various programming languages can be employed to create one or more of the applications 1206, structured in a variety of manners, such as object-oriented programming languages (e.g., Objective-C, Java, or C++) or procedural programming languages (e.g., C or assembly language). In a specific example, the third-party application 1240 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1240 can invoke the API calls 1250 provided by the operating system 1212 to facilitate functionality described herein.

Processing Components

Figure 13:
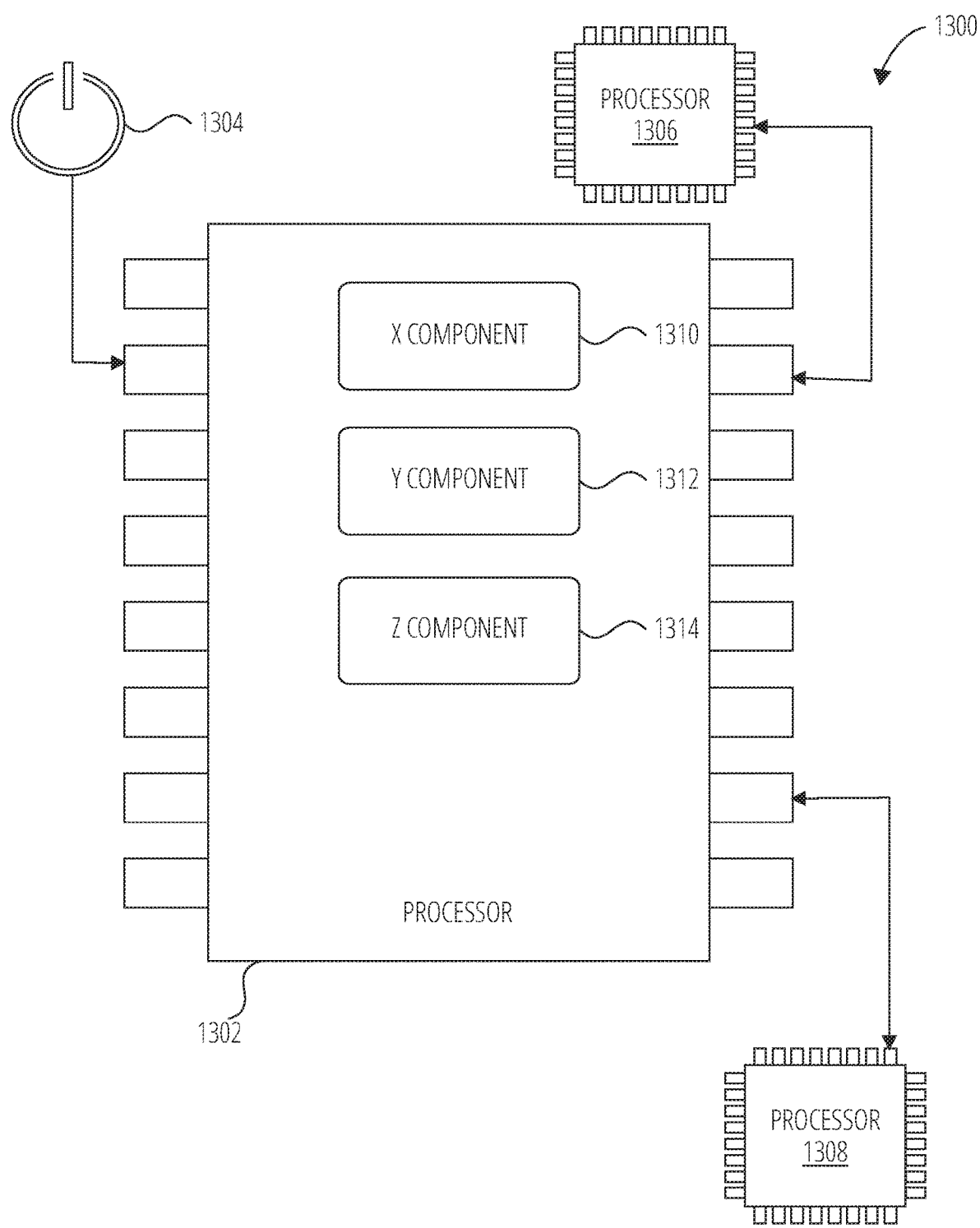
FIG. 13 is a diagrammatic representation of a processing environment, in accordance with some examples.

Turning now to FIG. 13, there is shown a diagrammatic representation of a processing environment 1300, which includes a processor 1302, a processor 1306, and a processor 1308 (e.g., a GPU, CPU or combination thereof).

The processor 1302 is shown to be coupled to a power source 1304, and to include (either permanently configured or temporarily instantiated) modules, namely an X component 1310, a Y component 1312, and a Z component 1314. The X component 1310 operationally generates previews of media items based on a media template and user profile data, the Y component 1312 operationally causes display of a presentation of a media collection, and the Z component 1314 operationally curates collections of media items. As illustrated, the processor 1302 is communicatively coupled to both the processor 1306 and the processor 1308.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
receiving, at a client device, a request to access a media collection, the media collection including at least a media item that comprises a media template that comprises a space to display content associated with a user profile associated with the client device, and the request comprising location data;
determining a contextual factor associated with the client device, the contextual factor including the location data of the request;
selecting a portion of the media collection based on the contextual factor, the portion of the media collection including at least the media item;
accessing user profile data associated with the user profile that corresponds with a user of the client device, the user profile data including an image that comprises a set of facial landmarks;
generating a preview of the media item from the portion of the media collection based on the media template associated with the media item and the image that includes the set of facial landmarks, the preview of the media item comprising a display of the image within the space to display content of the media template; and
causing display of a presentation of the media collection at the client device, the presentation of the media collection including a display of the preview of the media item.

2. The method of claim 1, wherein the user profile data is a first user profile data associated with a first user profile, and the method further comprises:
accessing second user profile data associated with a second user profile; and
wherein the generating the preview of the media item is based on the media template, the first user profile data, and the second user profile data.

3. The method of claim 1, wherein the contextual factor includes one or more of: temporal data, message data, user behavior data, and user preference data.

4. The method of claim 3, wherein the contextual parameter includes one or more of: the user profile data, location data, temporal data, message data, and user behavior data.

5. The method of claim 1, wherein the method further comprises:
receiving an update to the user profile data; and
updating the preview of the media item based on the update to the user profile.

6. A system comprising:
a memory; and
at least one hardware processor coupled to the memory and comprising instructions that causes the system to perform operations comprising:
receiving, at a client device, a request to access a media collection, the media collection including at least a media item that comprises a media template that comprises a space to display content associated with a user profile associated with the client device, and the request comprising location data;
determining a contextual factor associated with the client device, the contextual factor including the location data of the request;
selecting a portion of the media collection based on the contextual factor, the portion of the media collection including at least the media item;
accessing user profile data associated with the user profile that corresponds with a user of the client device, the user profile data including an image that comprises a set of facial landmarks;
generating a preview of the media item from the portion of the media collection based on the media template associated with the media item and the image that includes the set of facial landmarks, the preview of the media item comprising a display of the image within the space to display content of the media template; and
causing display of a presentation of the media collection at the client device, the presentation of the media collection including a display of the preview of the media item.

7. The system of claim 6, wherein the user profile data is a first user profile data associated with a first user profile, and the operations further comprise:
accessing second user profile data associated with a second user profile; and
wherein the generating the preview of the media item is based on the media template, the first user profile data, and the second user profile data.

8. The system of claim 6, wherein the contextual parameter includes one or more of: the user profile data, location data, temporal data, message data, and user behavior data.

9. The system of claim 8, wherein the contextual parameter includes one or more of: the user profile data, location data, temporal data, message data, and user behavior data.

10. The system of claim 6, wherein the operations further comprise:
receiving an update to the user profile data; and
updating the preview of the media item based on the update to the user profile data.

11. A non-transitory machine-readable storage medium comprising instructions that, when executed by one or more processors of a machine, cause the machine to perform operations comprising:
receiving, at a client device, a request to access a media collection, the media collection including at least a media item that comprises a media template that comprises a space to display content associated with a user profile associated with the client device, and the request comprising location data;
determining a contextual factor associated with the client device, the contextual factor including the location data of the request;
selecting a portion of the media collection based on the contextual factor, the portion of the media collection including at least the media item;
accessing user profile data associated with the user profile that corresponds with a user of the client device, the user profile data including an image that comprises a set of facial landmarks;
generating a preview of the media item from the portion of the media collection based on the media template associated with the media item and the image that includes the set of facial landmarks, the preview of the media item comprising a display of the image within the space to display content of the media template; and
causing display of a presentation of the media collection at the client device, the presentation of the media collection including a display of the preview of the media item.

12. The non-transitory machine-readable storage medium of claim 11, wherein the user profile data is a first user profile data associated with a first user profile, and the operations further comprise:

accessing second user profile data associated with a second user profile; and wherein the generating the preview of the media item is based on the media template, the first user profile data, and the second user profile data.

13. The non-transitory machine-readable storage medium of claim 11, wherein the contextual parameter includes one or more of: the user profile data, location data, temporal data, message data, and user behavior data.

14. The non-transitory machine-readable storage medium of claim 13, wherein the contextual parameter includes one or more of: the user profile data, location data, temporal data, message data, and user behavior data.

* * * * *